United States Patent
Scholz et al.

(10) Patent No.: US 10,847,812 B2
(45) Date of Patent: Nov. 24, 2020

(54) SEPARATOR PLATE, MEMBRANE ELECTRODE ASSEMBLY AND FUEL CELL

(71) Applicants: VOLKSWAGEN AG, Wolfsburg (DE); AUDI AG, Ingolstadt (DE)

(72) Inventors: Hannes Scholz, Braunschweig (DE); Matthias Reckers, Braunschweig (DE); Lutz Lackenmacher, Rötgesbüttel (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 140 days.

(21) Appl. No.: 15/852,824

(22) Filed: Dec. 22, 2017

(65) Prior Publication Data
US 2018/0183075 A1 Jun. 28, 2018

(30) Foreign Application Priority Data
Dec. 22, 2016 (DE) .................. 10 2016 125 355

(51) Int. Cl.
| | |
|---|---|
| *H01M 8/0221* | (2016.01) |
| *H01M 8/0258* | (2016.01) |
| *H01M 8/1018* | (2016.01) |
| *H01M 8/2418* | (2016.01) |
| *H01M 8/0223* | (2016.01) |
| *H01M 8/1004* | (2016.01) |
| *H01M 8/1011* | (2016.01) |
| *H01M 8/14* | (2006.01) |
| *H01M 8/0267* | (2016.01) |
| *H01M 8/083* | (2016.01) |

(Continued)

(52) U.S. Cl.
CPC ....... *H01M 8/0221* (2013.01); *H01M 8/0223* (2013.01); *H01M 8/0258* (2013.01); *H01M 8/1004* (2013.01); *H01M 8/1018* (2013.01); *H01M 8/2418* (2016.02); *H01M 8/0267* (2013.01); *H01M 8/083* (2013.01); *H01M 8/086* (2013.01); *H01M 8/1011* (2013.01); *H01M 2008/1095* (2013.01); *H01M 2008/1293* (2013.01); *H01M 2008/147* (2013.01)

(58) Field of Classification Search
CPC ....... H01M 2008/1095; H01M 8/0221; H01M 8/0258; H01M 8/1018
See application file for complete search history.

(56) References Cited

U.S. PATENT DOCUMENTS

| | | | | |
|---|---|---|---|---|
| 5,045,413 A | * | 9/1991 | Marianowski | ...... H01M 8/0206 429/460 |
| 6,455,179 B1 | * | 9/2002 | Sugita | .................. H01M 8/249 180/65.31 |

(Continued)

FOREIGN PATENT DOCUMENTS

| | | |
|---|---|---|
| DE | 699 03 721 T2 | 7/2003 |
| DE | 10 2008 038 201 A1 | 3/2009 |

*Primary Examiner* — Carlos Barcena
(74) *Attorney, Agent, or Firm* — Seed Intellectual Property Law Group LLP

(57) ABSTRACT

The invention relates to a separator plate, a membrane electrode assembly and a fuel cell stack, which are designed for higher voltages. It is provided that in the active region at least one of the cell components contains at least one insulating element which permanently enables different electrical potentials in a cell plane (orthogonal to the stacking direction).

9 Claims, 9 Drawing Sheets

(51) Int. Cl.
  *H01M 8/124* (2016.01)
  *H01M 8/086* (2016.01)

(56) References Cited

U.S. PATENT DOCUMENTS

| | | | | |
|---|---|---|---|---|
| 6,656,625 | B1* | 12/2003 | Thompson | B32B 18/00 |
| | | | | 429/465 |
| 7,820,335 | B2* | 10/2010 | Budinski | H01M 8/0271 |
| | | | | 429/457 |
| 2002/0146610 | A1* | 10/2002 | Hayashi | H01M 8/02 |
| | | | | 429/429 |
| 2004/0157103 | A1* | 8/2004 | Takeguchi | H01M 8/0258 |
| | | | | 429/413 |
| 2007/0184327 | A1* | 8/2007 | Ishioka | H01M 8/0273 |
| | | | | 429/457 |
| 2007/0298308 | A1* | 12/2007 | Yamamoto | H01M 8/0228 |
| | | | | 429/437 |
| 2008/0171250 | A1* | 7/2008 | Takeguchi | H01M 8/0263 |
| | | | | 429/444 |
| 2009/0023047 | A1* | 1/2009 | Kume | H01M 8/0258 |
| | | | | 429/434 |
| 2014/0186740 | A1* | 7/2014 | Kwon | H01M 8/2405 |
| | | | | 429/458 |
| 2016/0260987 | A1* | 9/2016 | Watanabe | H01M 8/2465 |

\* cited by examiner

SEPARATOR PLATE, MEMBRANE ELECTRODE ASSEMBLY AND FUEL CELL

BACKGROUND

Technical Field

The invention relates to a separator plate and a membrane electrode assembly, as well as a fuel cell with such items.

Description of the Related Art

Fuel cells use the electrochemical conversion of a fuel by reaction with oxygen to form water in order to generate electrical energy. For this purpose, fuel cells contain as core component so-called membrane electrode assemblies (MEA) which are a combination of an ion-conductive, in particular a proton-conductive, membrane and of an electrode (anode and cathode) respectively arranged on both sides of the membrane. Additionally, gas diffusion layers (GDL) may be arranged on both sides of the membrane electrode assembly on the sides of the electrodes facing away from the membrane. Usually the fuel cell takes the form of a plurality of cell units arranged in a stack, and of MEAs, whose electrical outputs add up. During operation of the fuel cell, the fuel, in particular hydrogen $H_2$ or a gas mixture containing hydrogen, is guided to the anode where an electrochemical oxidation of $H_2$ to $H^+$ with loss of electrons takes place. A transport of the $H^+$ protons from the anode chamber into the cathode chamber is effected via the electrolytes or the membrane, which separates the reaction chambers from each other in a gas-tight and electrically insulated manner (in a water-bound or water-free manner). The electrons provided at the anode are guided to the cathode via an electrical line. Oxygen or a gas mixture containing oxygen is fed to the cathode so that a reduction of $O_2$ to $H_2O$ takes place under acquisition of the protons and electrons.

The fuel cell is formed by a plurality of individual cells arranged in the stack, which is why this is also called a fuel cell stack. Separator plates are arranged between the membrane electrode assemblies, which ensure that the single cells are supplied with the operating media, in other words, the reactants and a cooling medium. In addition, the separator plates ensure an electrically conductive contact with the membrane electrode assemblies.

Various designs of separator plates are known. The basic objectives in the design of separator plates are weight reduction, installation space reduction, cost reduction and an increase in power density. These criteria are important in particular for the mobile use of fuel cells, for example for the electric motor traction of vehicles.

Separator plates are made from an electrically conductive material since the actual electrical connection of the single cells to each other and to the outside is via this material. Said separator plates are normally made of a metal material, such as steel. Separator plates are however known which consist of an electrically conductive material based on carbon, in particular, graphite and graphite composite materials. Carbon-based materials (in the present case also referred to as carbon materials) have a number of advantageous properties, in particular a low density, which is why they are of particular interest for mobile applications. However, it is disadvantageous that for mechanical reasons carbon materials require a greater wall thickness than metal separator plates, which in turn is contrary to the goal of reducing installation space. The voltage level has conventionally been raised by increasing the height of the stack. In the case of graphite-based materials, for example, this would again have a negative effect on the stack height and power density.

Separator plates are frequently made from two contoured half-plates (the so-called anode plate and cathode plate) connected together, for example, glued or welded, in which the requisite flow fields for the operating media (anode gas, cathode gas and coolant) are formed by a suitable profile in the two half-plates. Here there is an anode flow field on the anode side and a cathode flow field on the cathode side, while the coolant flow field is formed on the inside between the two plate halves. Outside the flow fields, the separator plate has supply ports in the form of passages within the distribution areas, whereby least two anode gas ports are provided for the supply or removal of the anode gas, at least two cathode gas ports for the supply or removal of the cathode gas, and at least two coolant ports for the supply or removal of the coolant. In the stacked state, these supply ports align with each other and form operating medium main channels which run the full length of the fuel cell stack.

The fuel cells according to the invention, in addition to PEM fuel cells, also include phosphoric acid electrolytes (PAFC), molten carbonate fuel cells (MCFC at 650° C.), alkaline fuel cells (AFC), direct methanol fuel cells (DMFC) and solid oxide fuel cells (SOFC). These cover at least the separator plate according to the invention. In addition, it is ensured that no fuel cell reaction takes place in the area of the insulating element of the separator plate, in other words, the areas involved in the fuel cell reaction (such as the MEAs in the case of the PEM fuel cell) are not designed electrically or ionically conductive.

In the present case, the polymer electrolyte fuel cells in particular will be dealt with, but without excluding other fuel cell types.

The electrodes of a fuel cell are typically present as a catalyst coating on the gas diffusion layers, which are then characterized as gas diffusion electrodes or as a catalyst coating on the membrane. In the latter case, they are also referred to as catalytically coated membranes or CCMs.

That particular area of a MEA that is impacted with both reactant gases in the fuel cell stack for the anode and cathode and on which the fuel cell reaction takes place with the generation of electricity is characterized as the active area. The active area, however, only takes up a part of the total surface area of the MEA. The remaining areas, which may have a variable shape, are used to supply and distribute the operating media to the active area and to seal off and mechanically stabilize the MEA. These areas are characterized as not active or inactive areas. In conventional fuel cells, the active area has at least one rectangular shape.

Fuel cell stacks are used in vehicles for energy conversion. Different vehicles require different outputs. Fuel cell stacks in budget vehicles, for example, do not need output levels as high as sportier vehicles. A fuel cell stack with a low power output has fewer cells, or has smaller cells. The lower number of cells has the advantage of simpler and more cost-effective production due to fewer components, but the disadvantage of the lower voltage level and the higher currents generated at a given output. The low voltage level can in turn mean that it must first be converted to a higher level to drive an electric motor (DC/DC). This is bound up with an increased expense for the additional components. In addition, the lower the voltage span, the more efficiently and cost-effectively a DC/DC converter will work. A voltage as high as possible should therefore be aimed at, in particular for low fuel cell stack outputs, since at higher voltages the components carrying current, such as electrical lines, can be designed with a lower material thickness.

BRIEF SUMMARY

The invention is based on the object of overcoming the problems of the prior art and providing a fuel-cell stack with a high voltage, in particular, with a low output.

This problem is solved by a separator plate and a membrane electrode assembly with the characteristics of the independent claims.

A first aspect of the invention thus relates to a separator plate for a fuel cell. The separator plate according to the invention is contoured and has a first distribution area for feeding operating media, a second distribution area for the removal of operating media, an active area arranged between the two distribution areas, as well as an insulating element. The insulating element divides the active area into at least two electrically separate sections.

The separator plate according to the invention and in particular its arrangement in a fuel cell according to the invention overcomes the disadvantages of the prior art. In this way, with a simple number of sealing and media sections and also a simple number of pressing devices, MEAs and separator plates with an n-fold number of electrochemical cells, a lower current and a higher voltage can be generated than with comparable fuel cells of the same standard size. This means that the installation space and the associated cost advantages can be retained. In comparison with a conventional stack, the number of cells in a fuel cell is multiplied and the voltage thus increased, but the size of the active area of the cell is reduced, which results in a reduction in the current.

According to the invention, the active area is arranged centrally, in other words, between the two distribution areas, whereby there are preferably no other distribution areas within the separator plate. All n-cells of a separator plate according to the invention are supplied by the distribution areas, so that the basic structure of the separator plate need not be adapted to the number of cells.

Within the scope of the invention, a contouring of the separator plate means that the surface of the separator plate has elevations and depressions on the cell and/or coolant side which form channels for the transport of operating media.

As part of the separator plate, the insulating element according to the invention is an element which, in particular due to its material properties, electrically separates two electrically conductive parts of the separator plate from each other. The insulating element is designed continuous in the direction of extension, and preferably extends from one edge of the separator plate to the opposite edge of the separator plate. For the separator plate according to the invention to be effective, a requirement is that no fuel cell reaction takes place in the area of the insulating element, in other words, in the arrangement of the separator plate according to the invention, the insulated area of the membrane electrode assembly according to the invention is arranged also in the area of the insulating element. In other words, a membrane electrode assembly according to the invention, or a plurality of individual membrane electrode assemblies, is arranged on the separator plate according to the invention, wherein no catalyst and no conductive layer are arranged in the area of the insulating element of the separator plate according to the invention.

In a preferred embodiment of the invention, the insulating member is integrally bonded into the separator plate, and a flow resistance of operating media is not significantly affected by the insulating element. This embodiment has the advantage that the power density is not further reduced than beyond the loss at the active area, which inevitably arises due to the arrangement of the insulating element. In the present context, "not essentially" means that the separator plate according to the invention has no flow resistance in the area of the fluid-carrying channels for the operating media which exceeds the fluctuations of a conventional separator plate of the same shape and size. This can be achieved by the insulating element which, although electronically insulating, is nevertheless designed to be permeable for fluids, especially for the operating media, as is the case for example with porous materials. In this case, however, care must be taken that the fluid-carrying channels being formed by the pores do not extend beyond the cross-section of the separator plate, thereby ensuring that mixing of the operating media does not occur.

Presenting a special advantage, the flow resistance remains unaffected by the fact that the contouring of the separator plate continues over the insulating element; that is, the outer shape of the separator plate is not changed by the insulating element.

In a preferred embodiment of the invention, the insulating element extends between the distribution areas longitudinally and/or transversely but also diagonally or in another geometric configuration. Here, the created insulated areas, i.e., the subsequently active chemical cells, are as equal in size as possible. An extension of the insulating element transversely to the direction of extension of the active region is particularly preferred because the structure of the separator plate according to the invention in this embodiment places fewer demands on the distribution area as well as on the supply and removal of the operating media to and from the individual cells. The connection of the active area to the distribution area is not influenced here by the insulating element. Accordingly, it is not necessary to adapt flow channels of the distribution areas to the inventive design of the separator plate.

Another preferred embodiment of the invention provides that the insulating element comprises the same base material as the areas of the separator plate adjacent to the insulating element. This embodiment is associated in particular with production advantages and stability advantages since stresses, in particular in boundary areas between different materials, are reduced. These materials have the same or similar physical properties, in particular an identical thermal expansion. Damage to boundary areas within the separator plate due to temperature fluctuations or pressure effects while the separator plate is being pressed into a fuel cell stack are minimized, and thus the life of the fuel cell is not reduced in comparison to when conventional separator plates are used.

With the same base material, conductivity is purposefully increased in the areas of the separator plate adjacent to the insulating element. Alternatively, an electrically conductive base material is used in which subsequently the insulating elements are deliberately rendered non-conductive, e.g., by removing conductive constituents. For this purpose, the electrical conductivity is obtained by incorporating conductive particles. Another possibility is to equip the area of the separator plate in which the insulating element is arranged with switchable materials, i.e., for example with switchable semiconductors, memristors or piezo-elements which change their conductivity as a result of externally applied currents, magnetic fields or pressures. The introduction of switchable areas has the advantage that a fuel cell with the separator plate according to the invention can be used not only as a high-voltage but also as a low-voltage fuel cell.

With particular advantage, the separator plate according to the invention comprises two plate halves, each plate half having an insulating element. In particular, the insulating elements of the two plate halves are not interconnected. The insulating elements of the individual plate halves are rather formed separately, so that coolant channels arranged between the plate halves are not influenced by the insulating element. In addition to production advantages, it is also ensured that the coolant flow between the plate halves is not influenced by the insulating element.

An insulating element arranged according to the invention in a separator plate is made of an electrically insulating material, or has at least one electrically insulating surface enclosing the insulating element. One particularly suitable material are polymers, in particular thermosets, preferably polyethers, for example, resins such as epoxy resin.

Another aspect of the invention relates to a membrane electrode assembly for a fuel cell. In this case, the membrane electrode assembly has an ion-conducting membrane, in particular a polymer electrolyte membrane which, at least in an active area, has a catalyst material on both sides which is divided by an insulating element into at least two electrically and ionically separated sections.

The membrane electrode assembly according to the invention has at least two electrochemical cells in which a fuel cell reaction takes place, and which are formed by the division of the active area by the insulating element. Thus, in this embodiment, compared with conventional membrane electrode assemblies of the same shape and size, the total generated current is approximately halved, whereby the total generated voltage almost doubles. This is, however, only possible if the current within the cells is almost the same. This requires that the fuel cell reaction takes place only in the area of the two cells, but not in the area of the insulating element, since there is no catalyst material arranged here. Furthermore, the MEA is designed such that no electrical connection can arise between the individual segments of a separator plate. Advantageously, the membrane electrode assembly is a catalytically coated membrane (CCM). Particularly advantageously, the membrane electrode assembly has three separate insulating elements, one of which is arranged such that it divides the active area of the membrane into electrically separate regions, and two others are arranged such that they each divide the electrodes into electrically separate areas. This has, in particular, production advantages since the insulating element can be applied, for example, within the catalytic coating of the membrane. Alternatively, the insulating member extends across the cross-section of the entire membrane electrode assembly. In other words, the insulating element replaces all otherwise existing layers of the MEA, while aligning flush with the surface of the membrane electrode assembly. This embodiment in particular offers stability advantages for the membrane electrode assembly.

The membrane electrode assembly or the separator plate preferably comprises a gas diffusion layer on each electrode side, which the insulating element then preferably also has.

Polymers, in particular polyethylene terephthalate (PET) or silicones, are preferred electrically and ionically insulating materials which are particularly suitable as an insulating element in the membrane electrode assembly.

A further aspect of the invention relates to a fuel cell which has a membrane electrode assembly according to the invention and a separator plate according to the invention.

Another aspect of the invention relates to a fuel cell stack having a plurality of fuel cells with a separator plate according to the invention and/or a membrane electrode assembly according to the invention. The fuel cell stack according to the invention combines all the aforementioned advantages of the membrane electrode assembly according to the invention and the separator plate according to the invention. In particular, the membrane electrode assembly according to the invention and the separator plate according to the invention interact in the fuel cell stack according to the invention, thereby boosting the advantages.

The fuel cells according to the invention, in addition to PEM fuel cells, also include phosphoric acid electrolytes (PAFC), molten carbonate fuel cells (MCFC at 650° C.), alkaline fuel cells (AFC), direct methanol fuel cells (DMFC) and solid oxide fuel cells (SOFC). These comprise at least the separator plate according to the invention. In addition, it is ensured that no fuel cell reaction takes place in the area of the insulating element of the separator plate, in other words, the areas involved in the fuel cell reaction (such as the MEAS in the case of the PEM fuel cell) are not designed as electrically or ionically conductive.

A preferred embodiment provides that stacking the fuel cells results in a plurality of cell stacks, and an outer cell of a first cell stack is electrically connected to an outer cell of a second, in particular adjacent, cell stack, the two connected cells being arranged on opposite sides of the fuel cell stack. In other words, the result is a stack which has in each case more than one electrical potential at the top and bottom, and whose segments are electrically connected in series. This embodiment takes into account the polarity of the individual cells, which would otherwise be in conflict with the media supply. The electrically conductive connection is realized by, for example, a line or a conductor. To prevent short circuits, the conductor itself has an electrical insulation, and/or the insulating elements are in contact with each other, wherein the conductor is arranged in the area of these contact surfaces.

In the present case, the cell stacks result from cell segments, that is to say, from the individual cells which have been created by the division of the active area in the membrane electrode assembly or separator plate. The individual insulating elements are preferably located directly above each other and preferably form cells of equal size, so that they preferably have an almost identical voltage level.

Additional preferred embodiments of the invention arise from the other features stated in the subclaims.

The various embodiments of the invention mentioned in this application may be combined advantageously with one another unless stated otherwise in individual cases.

BRIEF DESCRIPTION OF THE SEVERAL VIEWS OF THE DRAWINGS

The invention will be explained in greater detail below with reference to the associated figures. The following is shown.

DETAILED DESCRIPTION

Figure 1A:
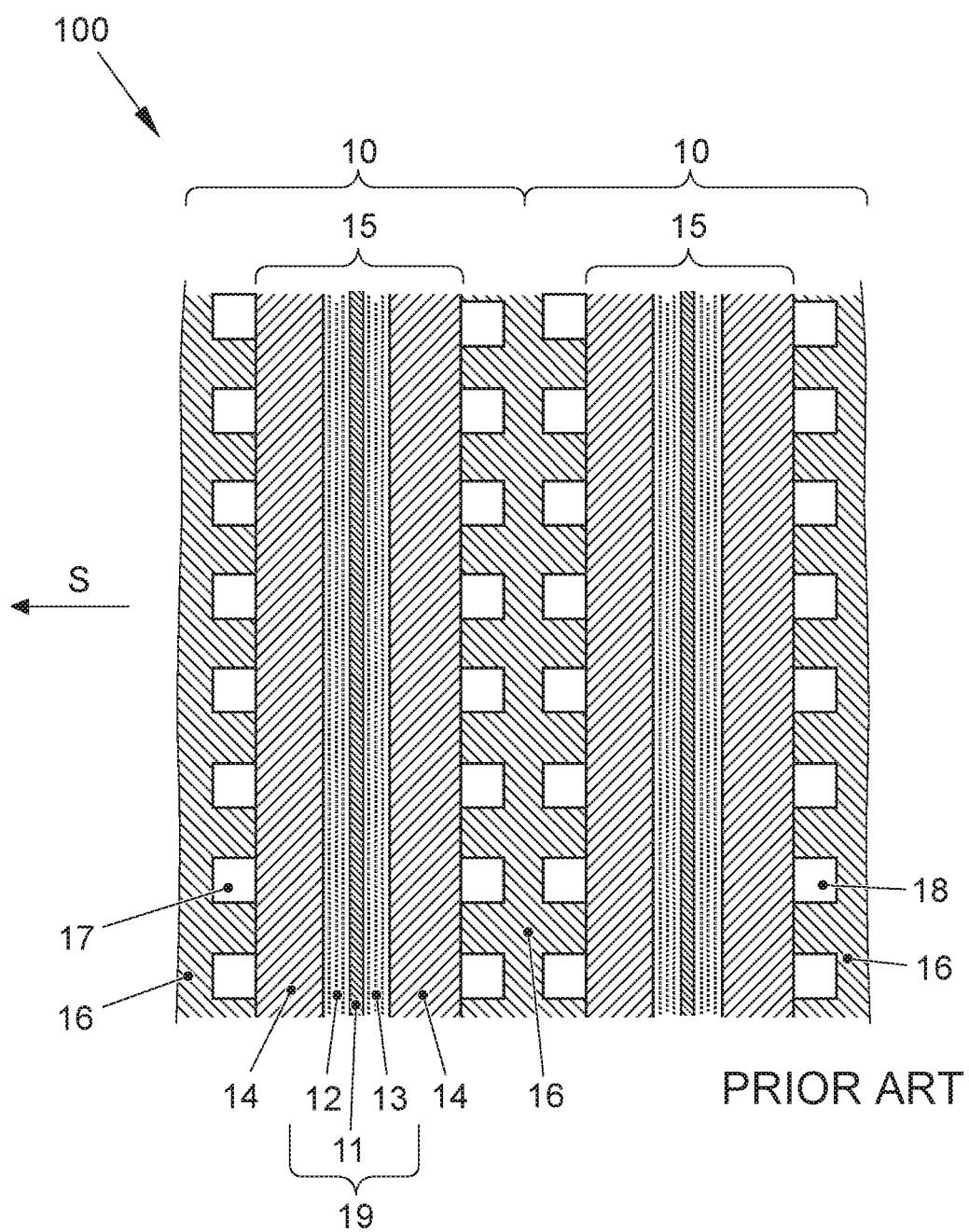
FIG. 1A a section of a fuel cell stack according to the prior art.

FIG. 1A shows a detail of a fuel cell stack designated as a whole by 100, of which only two individual fuel cells 10 are shown here.

Each fuel cell 10 has a polymer electrolyte membrane 11, which consists of an electrolytically conductive polymer material, which is particularly capable of conducting protons. Typically, the polymer material requires a certain humidity to maintain its electrolytic conductivity. A catalyst layer adjoins both flat sides of the membrane 11, namely an anode catalyst layer 12 and a cathode catalyst layer 13. The catalyst layers, 12 and 13, comprise a catalytic material, which is typically a precious metal, particularly platinum. Typically, the catalyst layers 12, 13 further comprise a porous, electrically conductive carrier material, on which the catalytic material is finely dispersed, for example a carbon-based material. The catalyst layers 12, 13 may further comprise components, for example polymer binder materials and the like.

A gas diffusion layer (GDL) 14 adjoins each catalyst layer 12, 13. The GDL comprises a material, through which liquids can flow, which is likewise electrically conductive. For example, the GDL 14 comprises a carbon-based foam or paper material. The structure made up of membrane 11, the catalyst layers 12, 13, as well as the gas diffusion layers 14 is also characterized as the membrane electrode assembly 15, in which the allocation of the gas diffusion layers 14 to the membrane electrode assembly 15 varies in the literature.

A separator plate 16, also called a flow field plate, is disposed between two membrane electrode assemblies 15. The separator plate 16 has anode flow channels 17 on its anode side through which an anode operating medium (fuel), in particular hydrogen, is supplied to the anodic catalyst layer 12. In addition, the separator plate 16 has cathode flow channels 18 on its cathode side through which cathode operating gas, which is usually an oxygen-containing gas, in most cases, air, is supplied to the cathodic catalyst layer 13. Usually, the separator plate 16 also has internal coolant channels, not shown here, through which a coolant for cooling the fuel cell stack 100 can be passed. The separator plate 16 is made of an electrically conductive material, for example, a metal, a metal alloy, graphite or an electrically conductive polymer material or polymer composite material. The separator plate 16 thus combines the functions of supplying the operating media, of cooling, and of making the electrical connection of the catalytic electrodes 12, 13 to an external circuit.

Normally plurality of such individual cells 10 is arranged in a fuel cell stack 100, whose electrical outputs combine. For electric vehicle applications, fuel cell stacks 100 typically comprise several hundred individual cells 10, 50.

The catalyst layers, 12 and 13, may be present, on one hand, as a coating on the membrane 11. In this case, this is also considered to be a catalyst coated membrane or CCM, which is designated overall with 19 in FIG. 1. Alternatively, the catalyst layers 12 and 13 may be present as a coating of the gas diffusion layers 14, so that they are then referred to as gas diffusion electrodes. The present invention primarily relates to the case of a catalytically coated membrane 19.

Figure 1B:
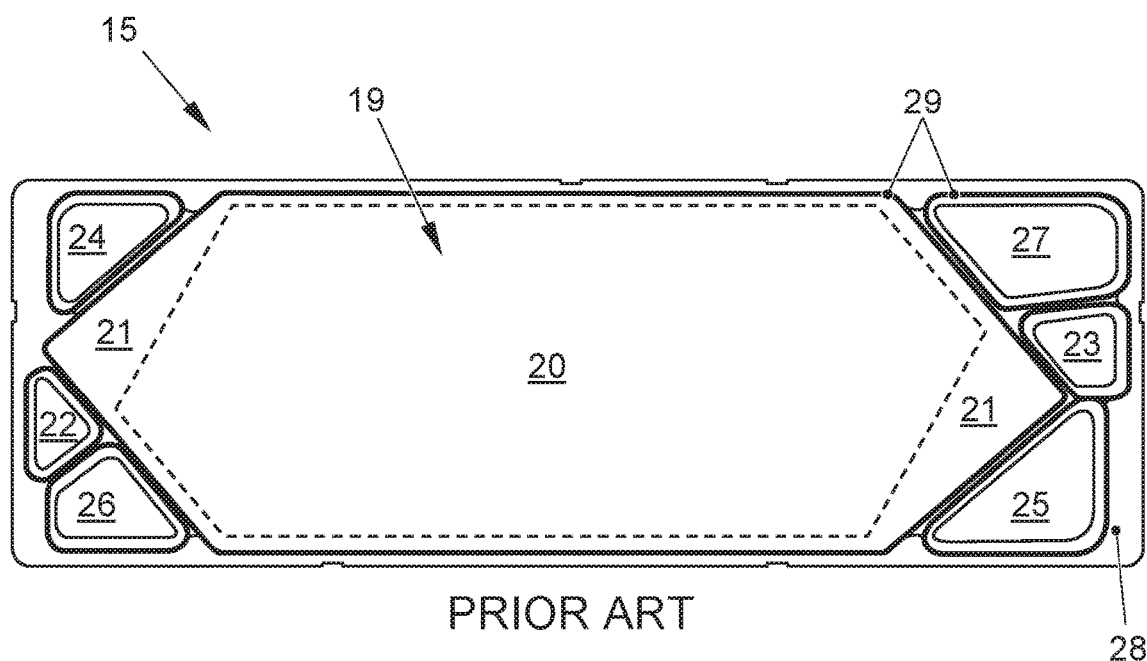
FIG. 1B a schematic representation of a plan view of a membrane electrode assembly according to the prior art, FIG. 2 a schematic representation of the plan view of a membrane electrode assembly in a first embodiment of the invention, FIG. 2A a schematic representation of the plan view of a membrane electrode assembly in a second embodiment of the invention, FIG. 2B a schematic representation of the plan view of a membrane electrode assembly in a third embodiment of the invention, FIG. 3 a schematic representation of the plan view of a separator plate according to a preferred embodiment of the invention, FIG. 3A a schematic sectional view through a fuel cell stack according to the preferred embodiment of the invention in a first sectional direction, FIG. 3B a schematic sectional view through a fuel cell stack according to the preferred embodiment of the invention in a second sectional direction, FIG. 3C a schematic sectional view through a fuel cell stack according to the preferred embodiment of the invention in a third sectional direction, FIG. 4 a schematic representation of the top view of a separator plate according to a further embodiment of the invention, FIG. 4A a schematic sectional view through a fuel cell stack according to the further embodiment of the invention, FIG. 5A a schematic sectional view of a cell stack in a fuel cell stack according to the prior art, and FIG. 5B a schematic sectional view of a cell stack in a fuel cell stack according to a preferred embodiment of the invention.

FIG. 1B shows a membrane electrode assembly 15 in a plan view of one of its flat sides. The membrane electrode assembly 15 shows the catalytically coated membrane 19. In the example shown, the catalyst coated membrane 19 has a hexagonal contour. Within this hexagonal contour, an active area 20 is arranged, which is indicated by a dashed line. Outside of the active area 20, the catalyst coated membrane 19 has inactive areas 21. The active area 20 is characterized in that in the installed state of the membrane electrode assembly 15 in a fuel cell stack 100 the fuel cell reactions at the anode and cathode take place in this area and electricity is thus generated. The inactive areas 21, on the other hand, are used for other functions, for example to supply operating media to the active area 20. Ideally, the polymer electrolyte membrane 11 is coated with the catalytic coatings 12 and 13 only in the active area 20.

The membrane electrode assembly 15 comprises various passage openings, 22 to 27, which are used to supply and remove the various operating media. A first anode port 22 thus serves to supply the anode operating gas to the cathodes 12 of the fuel cell stack 100 and an opposite second anode gas port 23 serves to take away the anode operating gas. Similarly, a first cathode port 24 serves to supply a cathode operating gas to the cathodes 13 of the fuel cell stack 100 and an opposite second cathode port 25 to take away the cathode operating gas. Finally, a first coolant port 26 serves to supply a coolant to the internal coolant channels of the separator plates 16 and an opposite second coolant port 27 to take away the coolant. The separator plates, which are not shown in detail, have substantially the same configuration as the illustrated membrane electrode assemblies 15, in particular corresponding ports. In this way, in the stacked state of the membrane electrode assemblies 15 and separator plates 16, operating medium main channels are formed which pass through the fuel cell stack 100 in its stacking direction S (see FIG. 1). The anode and cathode ports 22 to 25 are connected in a fluid-conducting manner to the corresponding anode or cathode channels 17, 18 of the separator plates 16 via open distribution channels of the separator plates 16 adjoining the stack 100. The coolant ports 26, 27 are connected to the internal coolant channels of the separator plates 16. The distribution channel structures connecting the ports 22 to 27 and the anode or cathode channels 17, 18 of the active area 20 extend into the inactive areas 21.

For mechanical support, the membrane 11 is typically enclosed on both sides by a protective layer 28, which encloses the membrane 11 at its edge areas. Optionally, the membrane 11 can also extend over the entire surface of the membrane electrode assembly 15 and be laminated on its edge areas with support layers 28. Furthermore, seals 29 can be seen in FIG. 1B which surround the operating medium passage openings 22 to 27 and the catalytically coated membrane 19 in order to seal them to the outside. The seals 29 may optionally be disposed on the separator plates 16 instead of the membrane electrode assembly 15 or on both.

As already stated, the fuel cell reaction takes place only in the active area 20, in particular in those locations where catalyst material is arranged. Thus, the target is to apply the catalyst layers, 12 and 13, only in this area to the extent possible, because the catalytic material represents the most expensive individual component of the fuel cell stack by far. On the other hand, the aim is to make the active area 20 as large as possible and the inactive areas 21 as small as possible in order to achieve the highest possible energy yield or to minimize the required installation space and the weight of the fuel cell. The contours of the active area 20 accordingly resulting from said targeting may deviate from the conventional rectangular contour and have an irregular contour. For example, as shown in FIG. 1B, a hexagonal contour of the active area 20 is created. This contour is restricted in a direction extending parallel to the main flow direction of the operating media by two parallel outer sides 30 opposite one another. The irregular hexagonal contour of the active area 20 shown further has a first pair of short sides 31 opposite one another as well as a second pair of short sides 32 opposite one another. In doing so, short sides 31 have a longer length than short sides 32.

Figure 2:
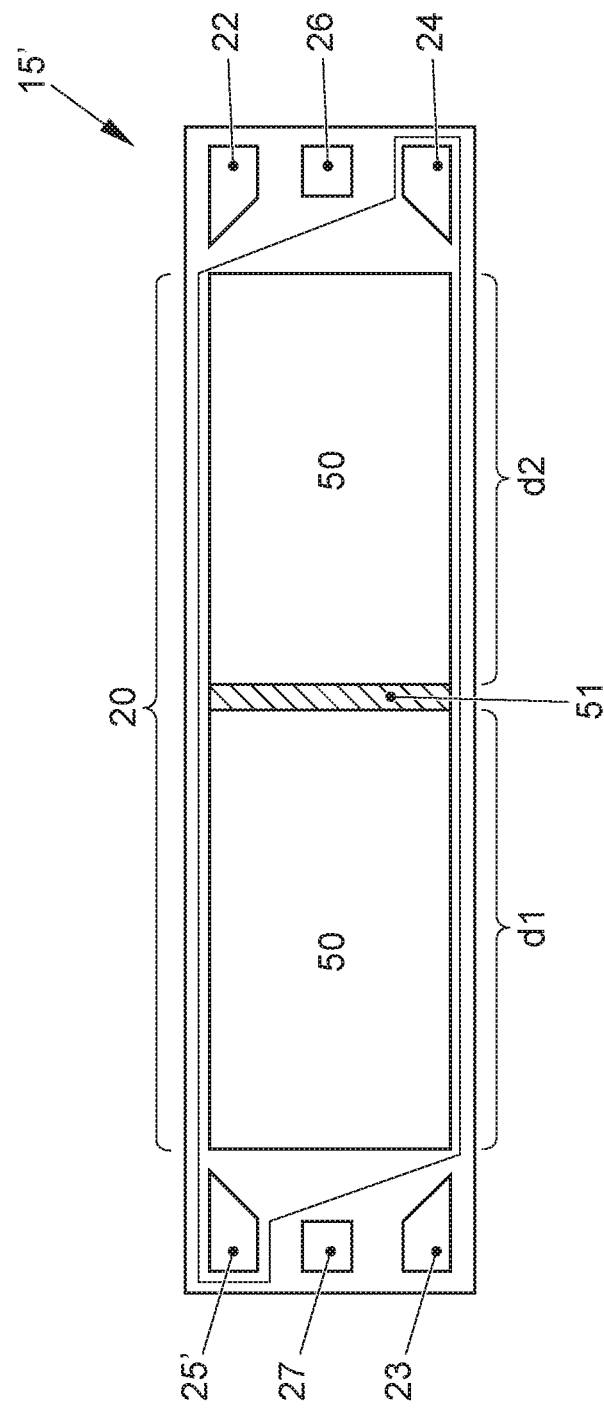
Figure 2A:
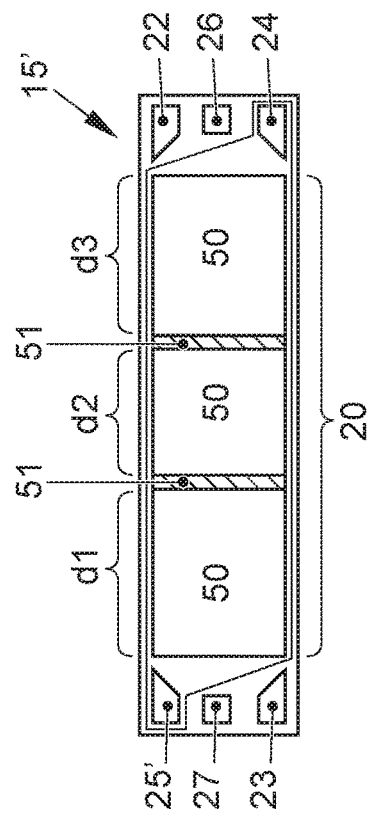
Figure 2B:
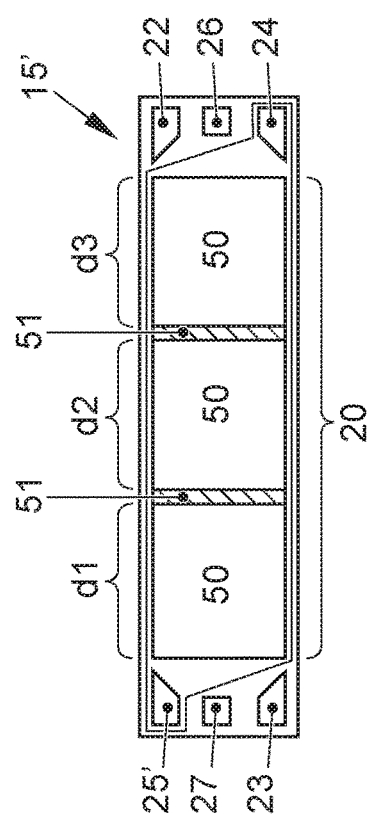

FIGS. 2, 2A and 2B each show a membrane electrode assembly 15' in each case in a preferred embodiment of the invention. The membrane electrode assembly 15' in FIG. 2 comprises an insulating element 51 extending transversely to the active area 20 in the embodiment shown. Here the insulating element 51 is disposed centrally so that the active area 20 is divided into two equal-sized sections (in FIG. 2, $d_1=d_2$), which in each case create the electrochemical cells 50. The embodiments shown in FIGS. 2A and 2B have in each case two insulating elements 51. In these embodiments, the active area 20 is divided into three sections which thus gives rise to three insulated cells 50. FIGS. 2A and 2B differ in the arrangement of the insulating elements 51. While the insulating elements in FIG. 2A are disposed at an equal distance $d_1$ from each other and thus result in three equal-sized cells, the embodiment in FIG. 2B results in different distances d between the insulating elements 51 and thus different cell areas.

The insulating element 51 is electrically and ionically non-conductive, so that the active area 20 is divided into electrically and ionically non-connected cells 50. In all illustrated embodiments, it extends over the full width of the active area 20 and possibly also over the width of the membrane electrode assembly 15'. It is so disposed that the membrane electrode assembly 15' has no catalyst in the area of the insulating element 51. Since the insulating element 51 itself is electrically and ionically non-conductive, no current flows between the cells 50 of a membrane electrode assembly 15', and no ion exchange takes place. The insulating element 52 is either applied to the membrane as an interruption to the catalyst layer and does not interrupt the membrane, or it penetrates the entire membrane electrode assembly 15, in particular also the gas diffusion layer 14 disposed on the catalyst layer.

In comparison with a conventional membrane electrode assembly 15, such as is shown, for example, in FIG. 1B, the membrane electrode assembly 15' according to the invention has a large number of electrochemical cells 51.

The position and shape of the operating medium main ports 22, 23, 24, 25', 26, 27 and also of the active area 20 are only by way of example and are not essential to the invention.

Figure 3:
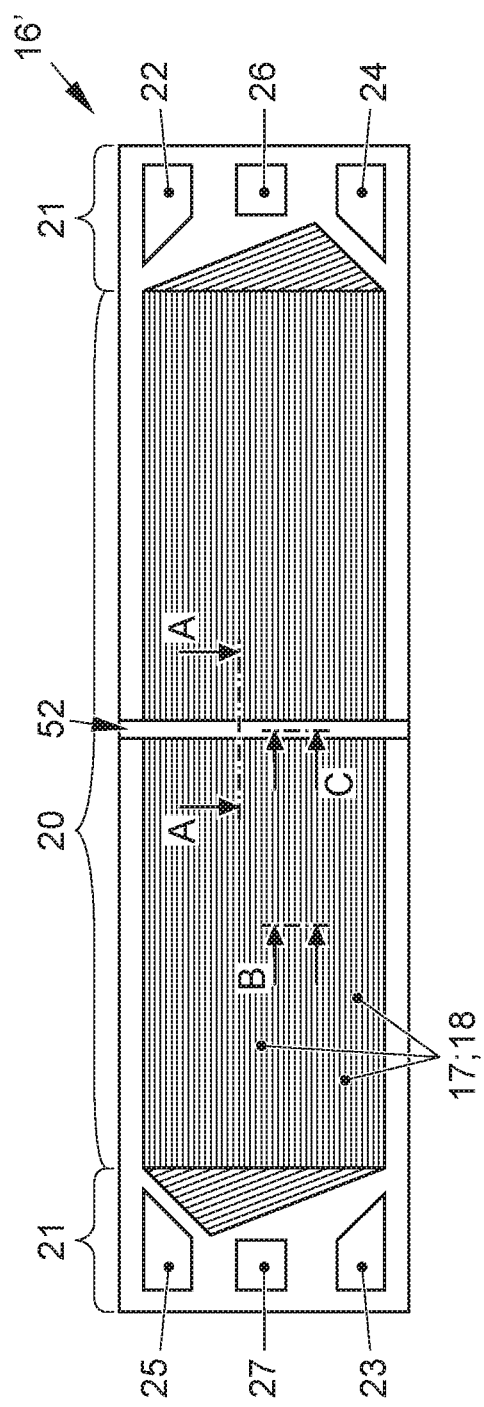

FIG. 3 shows a separator plate 16' according to the invention in a preferred embodiment. The separator plate 16' can be seen in a plan view and has two distribution areas 21 with in each case three main ports 22, 23, 24, 25, 26 and 27 for supplying and removing operating media to and from the active area 20. The position and shape of the ports and of the active area 20 are schematic and not essential to the invention. The active area 20 has a flow field consisting of anode and cathode flow channels 17, 18 which, starting from the main ports 22, 24, 26, run over the first distribution area 21 over the active area 20 and from there via the second distribution area 21 into the main ports 23, 25 and 27 to remove the operating media. In the separator plate 16', an insulating element 52 is arranged transversely to the flow direction of the operating media and thus transversely to the extension direction of the active area 20. This does not interrupt the flow of operating media through the channels 17, 18. In the present case, the insulating element 52 is made entirely of an electrically non-conductive material such as a polymer, in particular a thermoset polymer, preferably epoxy resin. Alternatively, the insulating element 52 can be designed as a layered body that has a core which is clad in an electrically insulating material. Here, the core not only has an insulating coating on the surface of the separator plate 16', but this is disposed over the full area and thus also over the thickness of the insulating element 52 so as to divide the separator plate 16' into electrically separated sections and to ensure that no current flows between them. In the two alternatives mentioned, the insulating element is arranged integrally bonded into the separator plate 16' and does not change the external shape of the separator plate 16' so that in particular the flow channels 17, 18 have the same shape and size as in the adjacent areas.

Figure 3A:
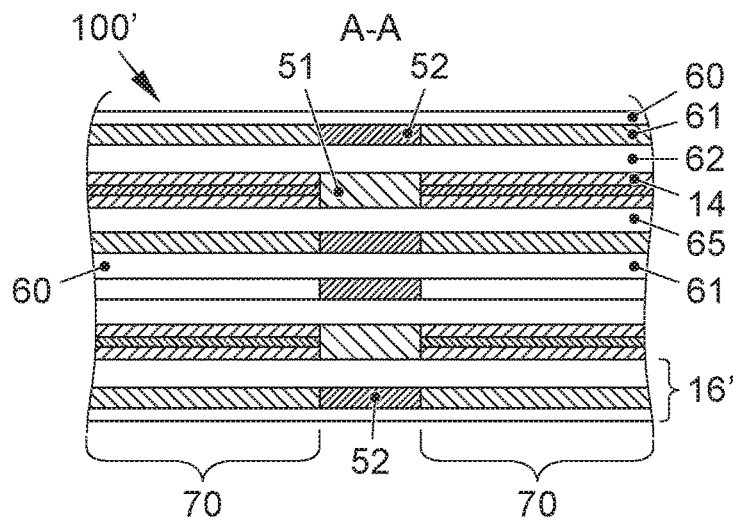
Figure 3B:
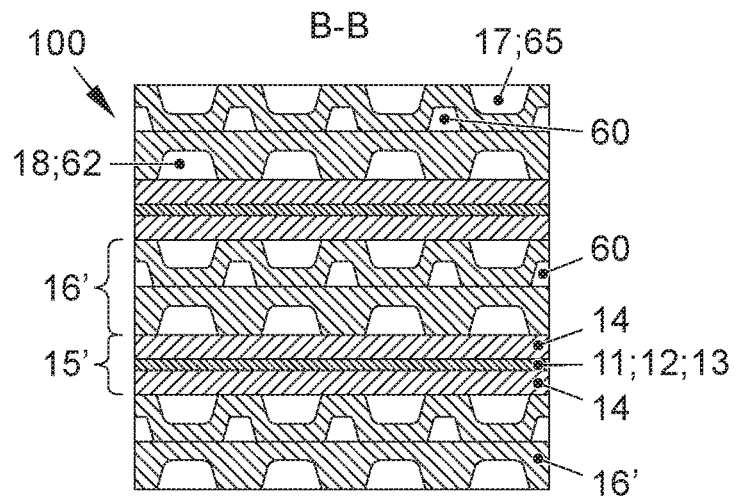
Figure 3C:
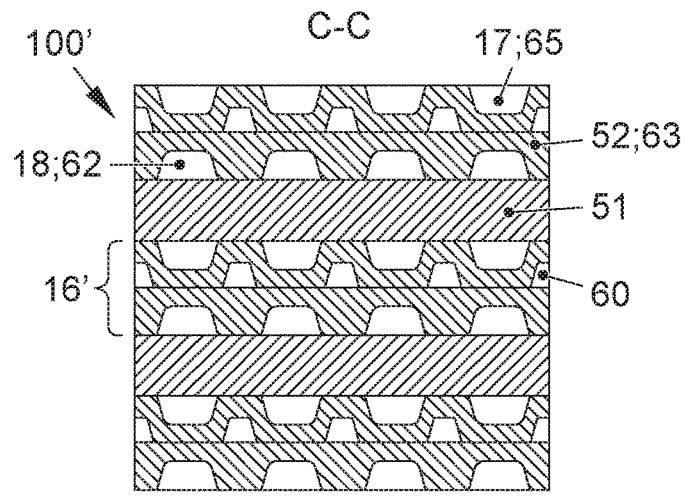

FIGS. 3A, 3B and 3C show sections through a fuel cell stack 100' which is made up of separator plates 16' according to the invention and membrane electrode assemblies 15' according to the invention, in a first embodiment. The positions of the illustrated sections in the stack can be found in FIG. 3. The separator plates 16' and the membrane electrode assemblies 15' are stacked on top of each other in such a way that the insulating elements 51, 52 lie congruently on top of each other as likewise the main ports 22, 23, 24, 25, 26 and 27.

FIG. 3A shows a section transverse to the insulating elements 51, 52, which lie on top of each other, along the anode and cathode flow channels 17, 18, which in the embodiment shown also lie on top of each other, so that the operating media of oxidants 62 and fuel 65 are shown in FIG. 3A. The position and shape of the flow channels 17, 18 are not essential to the invention but are only by way of example. Alternatively the flow channels could also have a meandering shape, permit cross-flows (in particular, the coolant channels 60) or have bends. The location of the insulating elements 51, 52 is shown and the areas adjacent to them. The insulating element 52 embedded in the separator plate 16' integrally terminates therewith and is made of an electrically insulating material—it can thus be referred to as an electrically insulating separator plate layer 63. An electrically conductive separator plate layer 61, which essentially corresponds to a conventional separator plate, is connected thereto.

In the illustrated embodiment, the insulating element 51 disposed in the membrane electrode assembly 15' penetrates the entire cross-section of the membrane electrode assembly, that is, the membrane 11, the catalyst layers 12, 13 arranged on it, and the gas diffusion layers.

FIG. 3B shows the section B-B, which shows a cross-section of the stack 100' according to the invention transversely to the direction of flow of the operating media. The cross-section is in an area of one of the cell stacks 70 formed by the insulating elements which each have the same footprint. The cross-section shown in FIG. 3B therefore essentially corresponds to the cross-section of a conventional fuel cell stack 100.

FIG. 3C also shows a cross-section of the stack 100' according to the invention transversely to the direction of flow of the operating media, but in the area of the stacked insulating elements 51, 52. There are no catalyst layers 12, 13 disposed in the area shown so that, despite the supplied fuel 65 and oxidant 62, no fuel cell reaction takes place in this area of the stack. The flow channels 17, 18 are not interrupted by the insulating elements.

Figure 4:
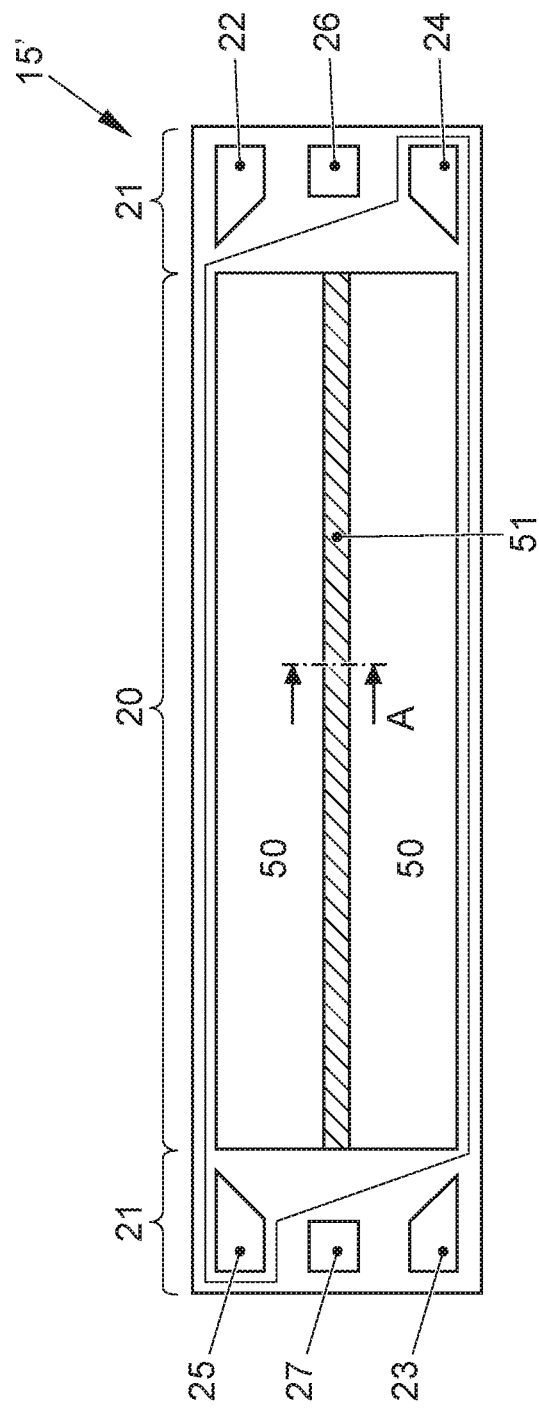

In FIG. 4, a membrane electrode assembly 15' according to the invention is shown in a further embodiment. The membrane electrode assembly 15' in FIG. 4 differs from the embodiment shown in FIG. 2 by the location of the insulating element 51. This is arranged not transversely but longitudinally with respect to the active area 20, in other words substantially in the direction of flow of the operating media. In the illustrated, embodiment the insulating element 51 extends centrally in the active area 20 from a distribution area or inactive area 21 to the opposite inactive area 21 so that the active area 20 is divided into two equal-sized cells 50.

Figure 4A:
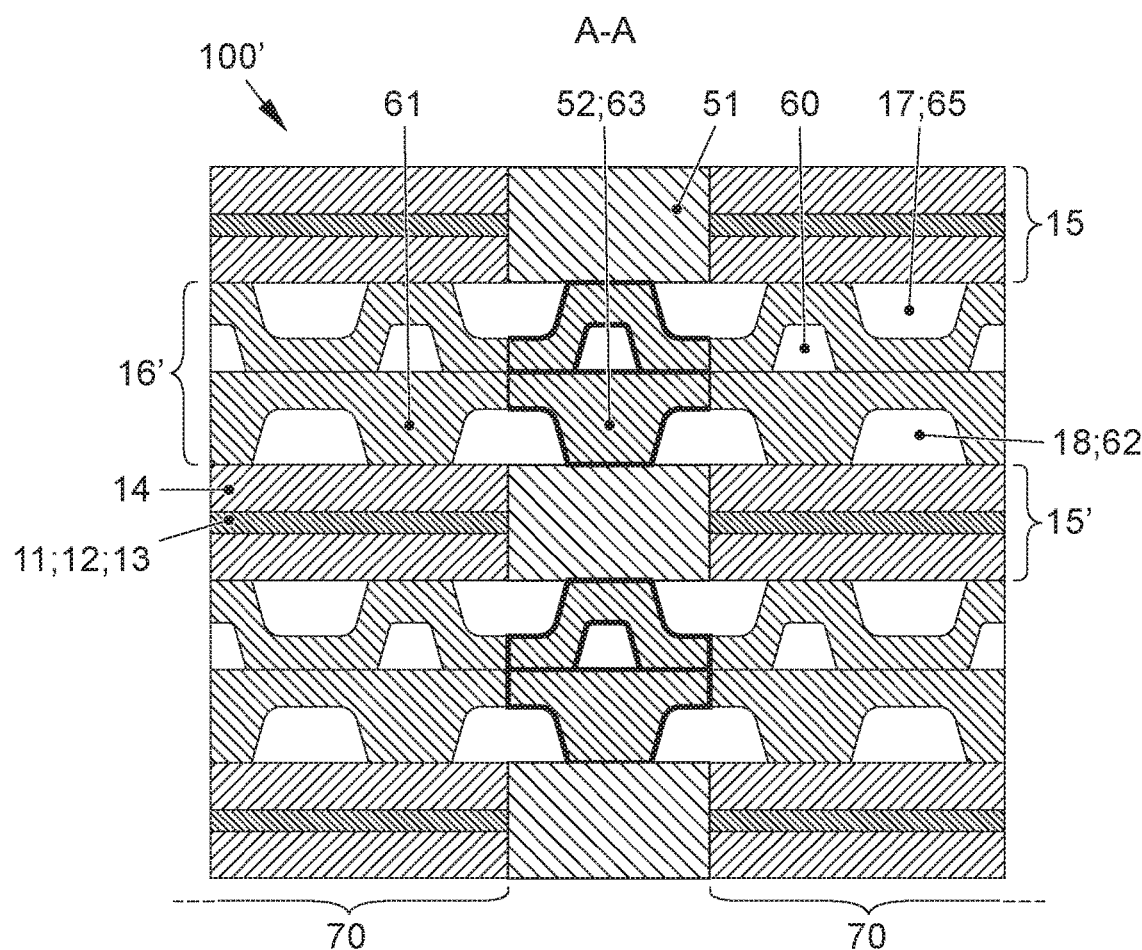

FIG. 4A shows a section through fuel cell stack 100' according to the invention which, in contrast to the one shown in FIGS. 3A-C, is made up of membrane electrode assemblies 15' according to the embodiment shown in FIG. 4 and corresponding separator plates 16' (not shown). The corresponding separator plates 16' in each case have an insulating element which extends in the same way over the separator plate 16 as the insulating element 51, shown in FIG. 4, of the membrane electrode assembly 15'. Accordingly, the insulating elements 51, 52 are arranged congruently one on top of the other also in the stack 100' in FIG. 4. Within the fuel cell stack 100', two cell stacks 70 are created.

Figure 5B:
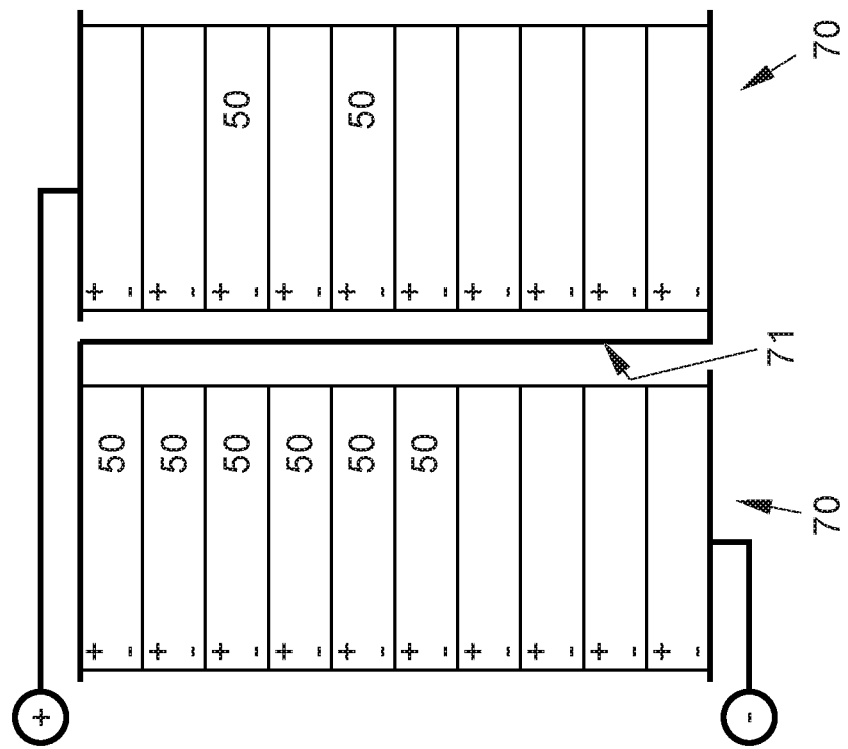

Cell stacks 70 of this kind are shown in FIG. 5B. Due to the polarity of the end cells it is not possible to connect the cell stack in series by means of a shared cover plate. For this reason, an electrically conductive connection 71 which connects the cell stack 70 in series is arranged between the outer cell 50 of the first cell stack and an outer cell 50 of the neighboring cell stack 70. Here, the two connected cells 50 are arranged at opposite ends of the two stacks 70. If the two insulating element types 51 and 52 are of a continuous design, and if, in particular, the insulating element 51 of the membrane electrode assembly 15' extends over the entire cross-section thereof, then the insulating elements 51, 52 will be in contact with each other (as shown in FIG. 4A). In this embodiment, the electrical connection 71 is preferably located within the insulating elements 51, 52. The electrical connection 71 is preferably an electrical conductor which has an insulated coating on the outside.

Figure 5A:
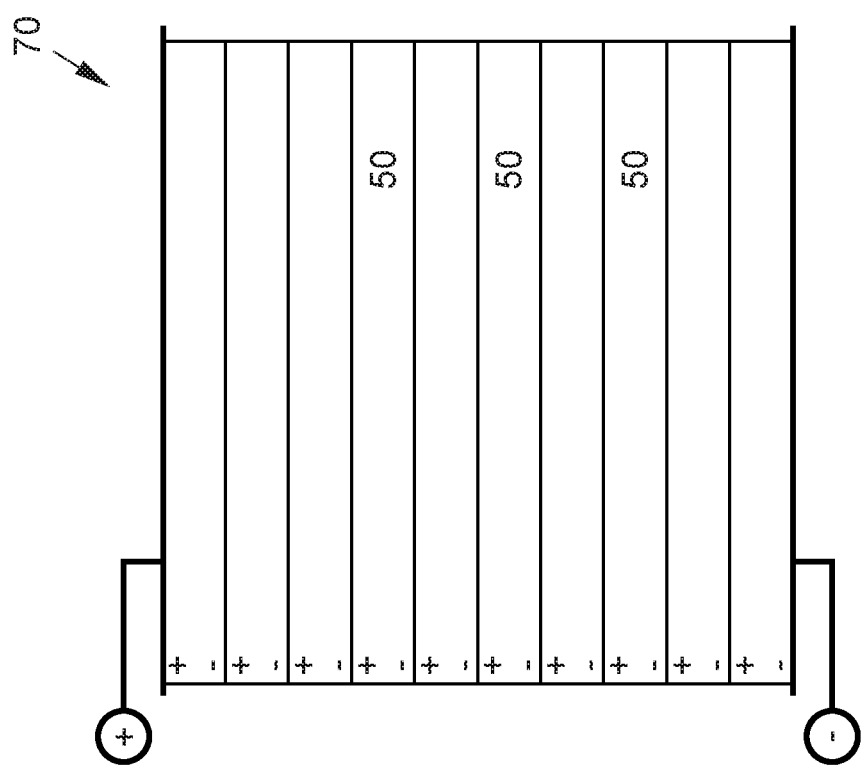

In comparison with the simple cell stack 70 shown in FIG. 5A, which is found in a fuel cell stack of the prior art, a footprint of the cell stack 70 in the stack according to the invention is reduced in comparison with the conventional stack. The current is thus reduced. On the other hand, a higher voltage level results because it is multiplied in cells connected in series—doubled in the embodiment shown.

German patent application no. 10 2016 125355.3, filed Dec. 22, 2016, to which this application claims priority, is hereby incorporated herein by reference.

The invention claimed is:

1. A contoured separator plate for a fuel cell, comprising:
   a first distribution area for supplying operating media;
   a second distribution area for removing operating media;
   an active area arranged between the first and second distribution areas that fluidically connects the first and second distribution areas to each other; and
   an insulating element which divides the active area into at least two electrically separate sections,
   wherein the insulating element extends between the first and second distribution areas in a first direction transverse to a second direction that extends from the first distribution area to the second distribution area.

2. The separator plate according to claim 1, wherein the insulating element is integrally bonded into the separator plate, and a flow resistance of operating media through the insulating element is not significantly affected.

3. The separator plate according to claim 1, wherein the insulating element extends between the two distribution areas longitudinally or transversely.

4. The separator plate according to claim 1, wherein:
   the first distribution area includes a first port for receiving the operating media;
   the first distribution area is configured to distribute the operating media from the first port to the active area;
   the second distribution area includes a second port for discharging the operating media; and
   the second distribution area is configured to distribute the operating media from the active area to the second port.

5. A contoured separator plate for a fuel cell, comprising:
   a first distribution area for supplying operating media;
   a second distribution area for removing operating media;
   an active area arranged between the first and second distribution areas that fluidically connects the first and second distribution areas to each other; and
   an insulating element which divides the active area into at least two electrically separate sections,
   wherein the insulating element is integrally bonded into the separator plate, and a flow resistance of operating media through the insulating element is not significantly affected, and
   Wherein contouring of the separator plate continues on the insulating element.

6. A contoured separator plate for a fuel cell, comprising:
   a first distribution area for supplying operating media;
   a second distribution area for removing operating media;
   an active area arranged between the first and second distribution areas that fluidically connects the first and second distribution areas to each other; and
   an insulating element which divides the active area into at least two electrically separate sections,
   Wherein the insulating element comprises the same base material as the areas of the separator plate adjacent to the insulating element.

7. A contoured separator plate for a fuel cell, comprising:
   a first distribution area for supplying operating media;
   a second distribution area for removing operating media;
   an active area arranged between the first and second distribution areas that fluidically connects the first and second distribution areas to each other; and
   an insulating element which divides the active area into at least two electrically separate sections, Wherein the separator plate is composed of two plate halves, and each plate half has an insulating element.

8. A contoured separator plate for a fuel cell, comprising:
a first distribution area for supplying operating media;
a second distribution area for removing operating media;
an active area arranged between the first and second distribution areas that fluidically connects the first and second distribution areas to each other; and
an insulating element which divides the active area into at least two electrically separate sections,
Wherein the insulating element extends between the first and second distribution areas in a first direction transverse to a flow direction of the operating media.

9. A contoured separator plate for a fuel cell, comprising:
a first distribution area for supplying operating media;
a second distribution area for removing operating media;
an active area arranged between the first and second distribution areas that fluidically connects the first and second distribution areas to each other; and
an insulating element which divides the active area into at least two electrically separate sections,
Wherein the insulating element extends between the first and second distribution areas in a first direction transverse to an extension direction of the active area.

* * * * *